(12) United States Patent
Hsia et al.

(10) Patent No.: US 11,392,174 B2
(45) Date of Patent: Jul. 19, 2022

(54) DOCKING APPARATUS COMMUNICATION

(71) Applicant: Hewlett-Packard Development Company, L.P., Spring, TX (US)

(72) Inventors: Yi-Fan Hsia, Taipei (TW); Hui-Ying Yang, Shanghai (CN); Hung Lung Chen, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 17/042,469

(22) PCT Filed: May 10, 2018

(86) PCT No.: PCT/US2018/032174
§ 371 (c)(1),
(2) Date: Sep. 28, 2020

(87) PCT Pub. No.: WO2019/216902
PCT Pub. Date: Nov. 14, 2019

(65) Prior Publication Data
US 2021/0365070 A1    Nov. 25, 2021

(51) Int. Cl.
*G06F 1/16* (2006.01)
*G06F 13/42* (2006.01)

(52) U.S. Cl.
CPC ........ *G06F 1/1632* (2013.01); *G06F 13/4282* (2013.01); *G06F 2213/0042* (2013.01)

(58) Field of Classification Search
CPC ............... G06F 13/4282; G06F 1/1632; G06F 2213/0042
See application file for complete search history.

(56) References Cited

U.S. PATENT DOCUMENTS

| 5,867,406 A | 2/1999 | Yanagisawa |
| 9,396,148 B2 | 7/2016 | Inha et al. |
| 9,791,906 B2 | 10/2017 | Hijazi et al. |
| 2009/0077208 A1 | 3/2009 | Nguyen et al. |
| 2010/0205463 A1* | 8/2010 | Magnusson ............. G06F 1/266 713/300 |
| 2012/0190406 A1 | 7/2012 | Chen |
| 2014/0049904 A1 | 2/2014 | Hume |
| 2015/0282073 A1 | 10/2015 | Davidson et al. |
| 2016/0117268 A1 | 4/2016 | Griffin |
| 2016/0286024 A1 | 9/2016 | Cohn et al. |
| 2017/0161221 A1 | 6/2017 | Yakame |
| 2017/0242814 A1 | 8/2017 | Voor et al. |
| 2017/0286343 A1* | 10/2017 | Rozic .................... G06F 13/385 |
| 2018/0074546 A1 | 3/2018 | DeCamp et al. |

FOREIGN PATENT DOCUMENTS

WO    WO-2017222552 A1    12/2017

* cited by examiner

*Primary Examiner* — Zachary K Huson
(74) *Attorney, Agent, or Firm* — Conley Rose PC

(57) ABSTRACT

Examples of communication of clocking apparatuses with computing devices are described. In an example implementation, a docking device and a computing device communicate through a Universal Serial Bus (USB) port of a USB hub of the docking device in USB Alternate Mode based on USB protocol-based messages.

15 Claims, 7 Drawing Sheets

DOCKING APPARATUS COMMUNICATION

BACKGROUND

Docking apparatuses, also referred to as docking devices or docking stations, are used for connecting a computing device to other external devices, such as printers, scanners, input-output devices, and the like, for providing extended functionalities to the computing device. The docking apparatus and the computing device may have a respective interface connector, for example, a port or a receptacle, for interconnecting the docking apparatus and the computing device.

BRIEF DESCRIPTION OF DRAWINGS

The following detailed description references the drawings, wherein.

DETAILED DESCRIPTION

Figure 1:
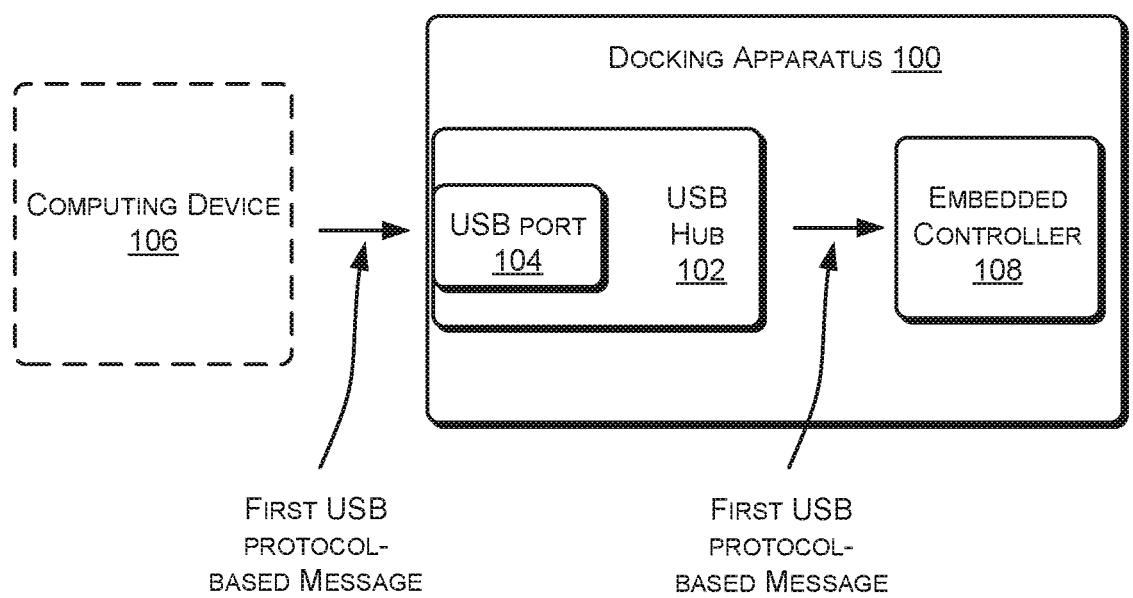
FIG. 1 illustrates a block diagram of a docking apparatus, according to an example of the present subject matter.

A computing device may be provided with an interface connector to connect to a corresponding interface connector in a docking apparatus for providing extended functionalities to the computing device. The computing device, also referred to as a host device, and the docking apparatus, each may have a Universal Serial Bus (USB) port or receptacle for establishing a connection between the computing device and the docking apparatus. In some examples, the docking apparatus may include a USB plug-connector, and the computing device may include a USB receptacle in which the USB plug-connector may be inserted to establish the connection. In some examples, both the computing device and the docking apparatus may include a respective USB receptacle, and a connection may be established using a USB cable connected to the USB receptacle of the docking apparatus and the USB receptacle of the computing device. In an example, the USB port or receptacle may be a USB Type-C port or receptacle.

The USB port or receptacle in the docking apparatus and the computing device may communicate in USB Alternate Mode. USB Alternate Mode allows for communication through a USB interface based on protocols other than USB protocol. While the channel of communication is USB-based, the communication in USB Alternate Mode is performed using Vendor Defined Messages (VDMs). The docking apparatus may include an embedded controller and a power delivery (PD) controller. For communicating information from the docking apparatus to the computing device, the embedded controller of the docking apparatus may encode the information and send the encoded information to the PD controller of the docking apparatus over an inter-integrated circuit (I2C). The PD controller of the docking apparatus may then transmit the encoded information in the form a VDM to a PD controller in the computing device. The PD controller of the computing device may decode the VDM to determine the information and may forward the information to a control unit of the computing device over an I2C for performing an action based on the information received from the docking apparatus. The information from the computing device to the docking apparatus may be communicated in a similar manner, where the control unit and the PD controller in the computing device communicate over an I2C, the embedded controller and the PD controller in the docking apparatus communicate over an I2C, and the PD controller of the computing device and the PD controller of the docking apparatus communicate through VDMs.

With VDMs, the computing device and the docking apparatus may either have to be of the same vendor or have to be of vendors that can recognize and process VDMs of each other. Thus, a computing device and a docking apparatus of different vendors which cannot recognize and process VDMs of each other cannot communicate over USB Alternate Mode.

The present subject matter describes approaches for communication of docking apparatuses and computing devices without using VMDs. Communication without VDMs allows a docking apparatus and a computing device of different vendors to communicate with each other.

According to an example implementation of the present subject matter, a docking apparatus and a computing device may communicate with each other through a USB hub in the docking apparatus using USB protocol-based messages. In an example implementation, the USB hub in the docking apparatus includes a USB port which is couplable to a USB receptacle of a computing device to communicate in USB Alternate Mode. The USB port and the USB receptacle, for example, may be a USB Type-C port and a USB Type-C receptacle, respectively, to communicate in USB Type-C Alternate Mode. The USB hub of the docking apparatus communicates with an embedded controller of the docking apparatus and also communicates with a control unit of the computing device through USB protocol-based messages for the exchange of information between the docking apparatus and the computing device.

Communication through USB ports and USB receptacles in USB Alternate Mode using USB protocol-based messages eliminates the use of VDMs, which facilitates communication between docking apparatuses and computing devices of different vendors.

The present subject matter is further described with reference to the accompanying figures. Wherever possible, the same reference numerals are used in the figures and the following description to refer to the same or similar parts. It should be noted that the description and figures merely illustrate principles of the present subject matter. It is thus understood that various arrangements may be devised that, although not explicitly described or shown herein, encompass the principles of the present subject matter. Moreover, all statements herein reciting principles, aspects, and examples of the present subject matter, as well as specific examples thereof, are intended to encompass equivalents thereof.

FIG. 1 illustrates a block diagram of a docking apparatus 100, according to an example of the present subject matter. The docking apparatus 100 may be a docking device or a docking station that allows a computing device, such as a laptop, a desktop computer, a tablet, a smartphone, and the like, to simultaneously connect to various external devices, such as a printer, a scanner, a router, a storage device, a server, and the like. The docking apparatus 100 includes a USB hub 102 including a USB port 104. The USB port 104 is couplable to a computing device 106 to communicate in USB Alternate Mode. In an example implementation, the USB port 104 is a USB Type-C port to communicate in USB Type-C Alternate Mode. The USB port 104 may couple to a USB port or receptacle (not shown) of the computing device 106. The docking apparatus 100 may also include multiple other communication ports to which external devices, such as a printer, a scanner, a router, a storage device, a server, and the like, may be connected to provide extended functionalities of the computing device 106.

As shown in FIG. 1, the docking apparatus 100 also includes an embedded controller 108. The embedded controller 18 is coupled to the USB hub 102. The embedded controller 108 may be implemented through a combination of any suitable hardware and computer-readable instructions. The embedded controller 108 may be implemented in a number of different ways to perform various functions for the purposes of communication of the docking apparatus 100 with the computing device 106. For example, the computer-readable instructions for the embedded controller 108 may be processor-executable instructions stored in a non-transitory computer-readable storage medium, and the hardware for the embedded controller 108 may include a processing resource to execute such instructions for communication of the docking apparatus 100 with the computing device 106. In some examples, the non-transitory computer-readable storage medium may store instructions which, when executed by the processing resource, implement the embedded controller 108. The processing resource may be implemented as microprocessors, microcomputers, microcontrollers, digital signal processors, central processing units, state machines, logic circuitries, and/or any devices that manipulate signals based on operational instructions. Among other capabilities, the processing resource may fetch and execute computer-readable instructions stored in a non-transitory computer-readable storage medium. The non-transitory computer-readable storage medium may include, for example, volatile memory (e.g., RAM), and/or non-volatile memory (e.g., EPROM, flash memory, NVRAM, memristor, etc.). In another example, the embedded controller 108 may be implemented by electronic circuitry.

In an example implementation, the USB hub 102 receives, through the USB port 104 communicating in USB Alternate Mode, a first USB protocol-based message from the computing device 106. The first USB protocol-based message includes a first device operating parameter. In an example implementation, the first device operating parameter refers to a parameter associated with the docking apparatus 100 or with the computing device 106, based on which an action may be executed in the docking apparatus 100. Some examples of the first device operating parameter are described with respect to FIG. 2.

Upon receiving the first USB protocol-based message, the USB hub 102 sends the first USB protocol-based message to the embedded controller 108. The embedded controller 108 received the first USB protocol-based message from the USB hub 102, and executes a first action in the docking apparatus 100 based on the first device operating parameter. Some examples of the first device operating parameter are described with respect to FIG. 2.

Figure 2:
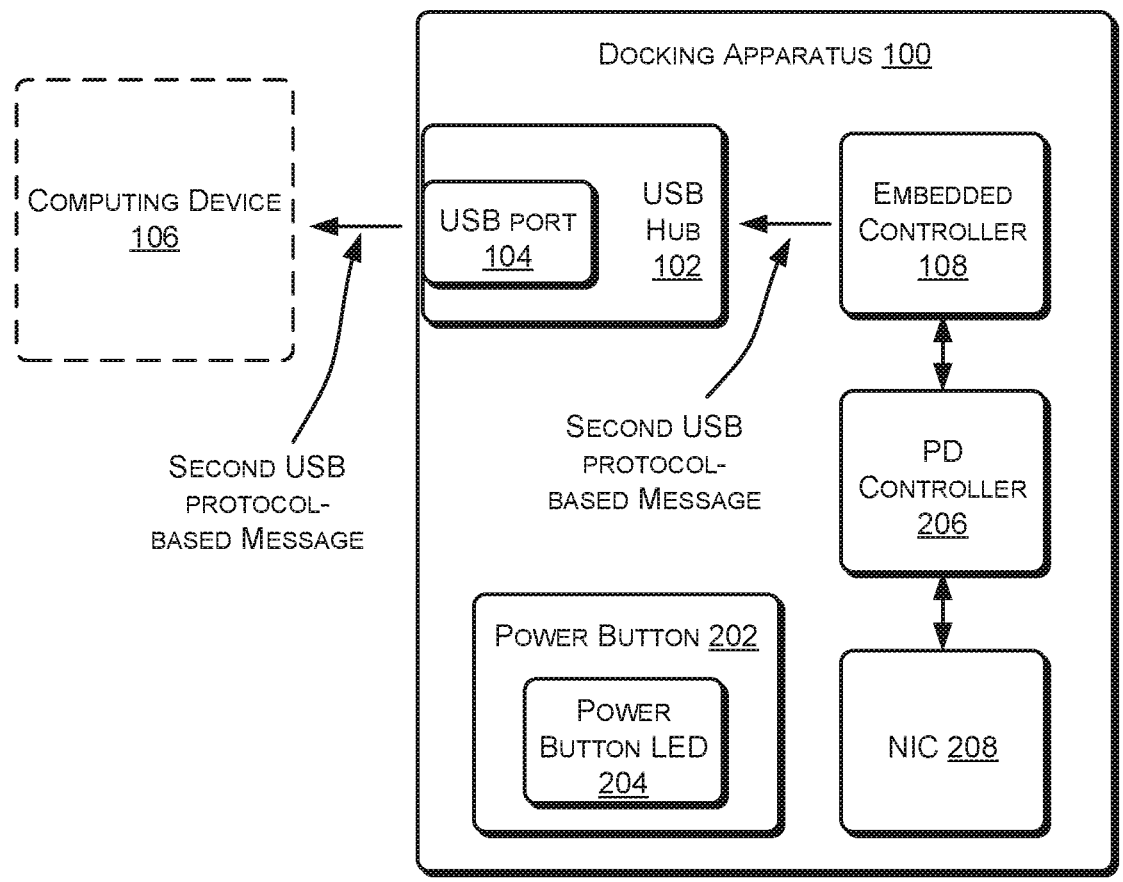
FIG. 2 illustrates a block diagram of a docking apparatus couplable to a computing device, according to an example of the present subject matter.

FIG. 2 illustrates a block diagram of the docking apparatus 100 couplable to the computing device 106, according to an example of the present subject matter. Apart from the USB hub 102, the USB port 104, and the embedded controller 108, the docking apparatus 100 includes a power button 202, a power button light emitting diode (LED) 204, a PD controller 206 coupled to the embedded controller 108, and a network interface card (NIC) 208 coupled to the PD controller 206.

The docking apparatus 100 may communicate with the computing device 106 to set the power button LED 204 of the docking apparatus 100 based on a power-mode status of the computing device 106. The power-mode status of the computing device 106 may indicate whether the computing device 106 is ON, OFF, in sleep, in hibernation, etc. In an example implementation, the first device operating parameter in the first USB protocol-based message, received from the computing device 106, may be indicative of a power-mode status of the computing device 106. The power-mode status of the computing device 106 may be based on a power-mode as selected by a user of the computing device 106. The embedded controller 108 may receive the first USB protocol-based message from the USB hub 102 and may decode the first USB protocol-based message to determine the power-mode status of the computing device 106. The embedded controller 108 may then execute the first action to set the power button LED 204 of the docking apparatus 100, based on the power-mode status of the computing device 106. Table 1 illustrates a mapping table enlisting examples of power-mode status of the computing device 106 and status of power button LED corresponding to each power-mode status.

TABLE 1

| Power-mode status of computing device | Status of power button LED in docking apparatus |
|---|---|
| ON | ON |
| OFF | OFF |
| Sleep | Blink |
| Hibernate | OFF |

In an example implementation, the mapping table as illustrated by Table 1 may be stored in a memory (not shown) in the docking apparatus 100. The embedded controller 108 may refer to the stored mapping table to execute the first action to set the power button LED based on the power-mode status of the computing device 106 as determined by the first USB protocol-based message received from the computing device 106. Thus, if the computing device 106 is ON, the embedded controller 108 sets the power button LED 204 in ON state. Similarly, if the computing device 106 is OFF or hibernates, the embedded controller 108 sets the power button LED 204 in OFF state. Further, if the computing device 106 is in sleep, the embedded controller 108 sets the power button LED 204 in blink state.

Further, the docking apparatus 100 may communicate with the computing device 106 to set out-of-band host bus media access control (MAC) address (OOB HBMA) for the NIC 208 of the docking apparatus 100. In an example implementation, the first device operating parameter in the first USB protocol-based message, received from the computing device 106, may include an OOB HBMA for the docking apparatus 100. The OOB HBMA may be provided to the computing device 106 by a user. The embedded controller 108 may receive the first USB protocol-based message from the USB hub 102 and may decode the first USB protocol-based message to determine the OOB HBMA. The embedded controller 108 may then execute the first action to send the OOB HBMA to the PD controller 206 over an I2C. The PD controller 206 may further send the OOB HBMA to the NIC 208 over an I2C. The NIC 208 receives the OOB HBMA from the PD controller 206 and sets the NIC 208 based on the OOB HBMA. Thus, the OOB HBMA for the NIC 208 of the docking apparatus 200 can be set by inputting the OOB HBMA in the computing device 106 by a user.

Further, the docking apparatus 100 may communicate with the computing device 106 to switch ON or switch OFF the computing device 106 based on the actuation of the power button 202 of the docking apparatus 100. A user may operate the docking apparatus 100 to actuate the power button 202 to set an operating status of the docking apparatus 100. For example, the user may actuate the power button 202 to set the operating status of the docking apparatus 100 as 'ON', or actuate the power button 202 to set the operating status of the docking apparatus 100 as 'OFF'.

In an example implementation, the embedded controller 108 determines a second device operating parameter, where the second device operating parameter is indicative of the operating status of the docking apparatus 100. The embedded controller 108 accordingly generates and sends a second USB protocol-based message including the second device operating parameter to the USB hub 102. The USB hub 102 may receive the second USB protocol-based message from the embedded controller 108, and send the second USB protocol-based message to the computing device 106, through the USB port 104 communicating in USB Alternate Mode. The USB hub 104 may send the second USB protocol-based message to the computing device 106 to execute a second action in the computing device 106 based on the operating status of the docking apparatus 100. In an example, the operating status of the docking apparatus 100 may include a power-mode status (e.g., ON or OFF) of the docking apparatus 100. The computing device 106 may according execute the second action to turn ON or turn OFF the computing device 106.

Figure 3:
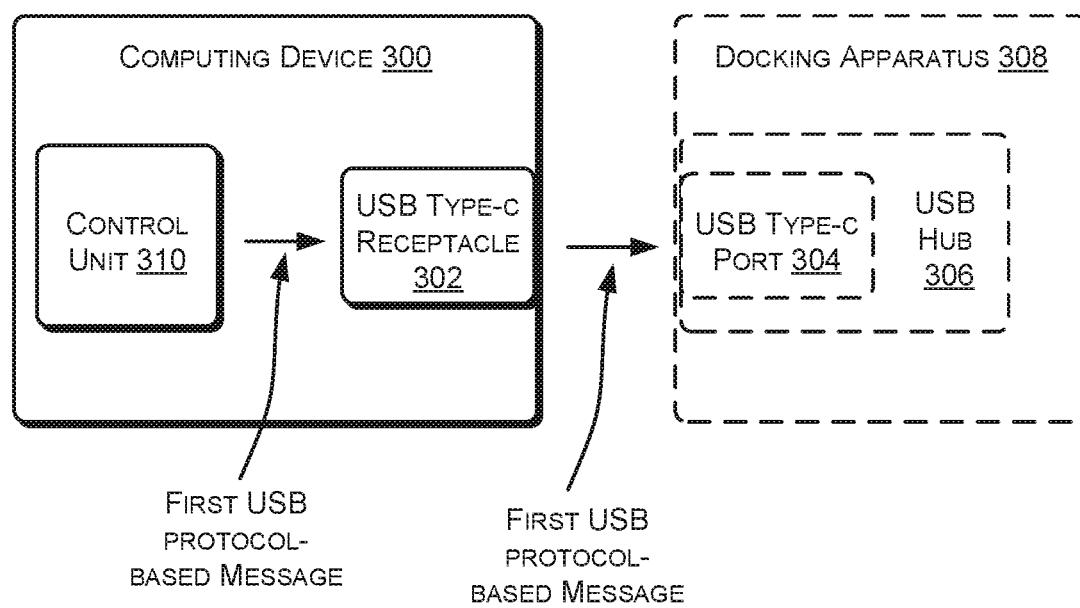
FIG. 3 illustrates a block diagram of a computing device, according to an example of the present subject matter.

FIG. 3 illustrates a block diagram of a computing device 300, according to an example of the present subject matter. The computing device 300 may be the same as the computing device 106. The computing device 300 may include, but not restricted to, a laptop, a desktop computer, a tablet, a smartphone, and the like.

The computing device 300, as shown in FIG. 3, includes a USB Type-C receptacle 302. The USB Type-C receptacle is couplable to a USB Type-C port 304 of a USB hub 306 of a docking apparatus 308 to communicate in a USB Type-C Alternate Mode. In an example implementation, the docking apparatus 308 may be similar to the docking apparatus 100 as illustrated and described with respect to FIGS. 1 and 2.

The computing device 300 also includes a control unit 310 coupled to the USB Type-C receptacle 302. The control unit 310 may be implemented through a combination of any suitable hardware and computer-readable instructions. The control unit 310 may be implemented in a number of different ways to perform various functions for the purposes of communication of the computing device 300 with the docking apparatus 308. For example, the computer-readable instructions for the control unit 310 may be processor-executable instructions stored in a non-transitory computer-readable storage medium, and the hardware for the control unit 310 may include a processing resource to execute such instructions for communication of the computing device 300 with the docking apparatus 308. In some examples, the non-transitory computer-readable storage medium may store instructions which, when executed by the processing resource, implement the control unit 310. The processing resource may be implemented as microprocessors, microcomputers, microcontrollers, digital signal processors, central processing units, state machines, logic circuitries, and/or any devices that manipulate signals based on operational instructions. Among other capabilities, the processing resource may fetch and execute computer-readable instructions stored in a non-transitory computer-readable storage medium. The non-transitory computer-readable storage medium may include, for example, volatile memory (e.g., RAM), and/or non-volatile memory (e.g., EPROM, flash memory, NVRAM, memristor, etc.). In another example, the control unit 310 may be implemented by electronic circuitry.

In an example implementation, the control unit 310 determines a first device operating parameter for communicating to the docking apparatus 308. As described earlier, the first device operating parameter may be indicative of a power-mode status of the computing device 300 or may include an OOB HBMA for the docking apparatus 308. The control unit 310 may determine the power-mode status of the computing device 300 as selected by a user of the computing device 300. The control unit 310 may determine the OOB HBMA as inputted by a user of the computing device 300. The control unit 310 generates and sends a first USB protocol-based message with the first device operating parameter to the USB hub 306 of the docking apparatus 308, through the USB Type-C receptacle 302 communicating in USB Type-C Alternate Mode.

The control unit 310 sends the first USB protocol-based message to the docking apparatus 308 to execute a first action in the docking apparatus 308 based on the first device operating parameter in the first USB protocol-based message. As described earlier, with the power-mode status of the computing device 300 in the first USB protocol-based message, the first action is to set a power button LED (not shown in FIG. 3) of the docking apparatus 308 based on the power-mode status of the computing device 106. Further, as described earlier, with the COB HBMA for the docking apparatus 308 in the first USB protocol-based message, the first action is to sets a NIC (not shown in FIG. 3) of the docking apparatus 308 based on the OOB HBMA.

Further, in an example implementation, the control unit 310 may receive a second USB protocol-based message with a second device operating parameter from the USB hub 306 of the docking apparatus 308, through the USB Type-C receptacle 302 communicating in USB Type-C Alternate Mode. As described earlier, the second device operating parameter is indicative of an operating status of the docking apparatus 308. In an example, the operating status of the docking apparatus 308 may include a power-mode status (e.g., ON or OFF) of the docking apparatus 308. A user may operate the docking apparatus 308 to actuate a power button of the docking apparatus 308 to set an operating status of the docking apparatus 308.

Upon receiving the second USB protocol-based message, the control unit 310 executes a second action in the computing device 300 based on the operating status of the docking apparatus 308 as received in the second USB protocol-based message. In an example implementation, the second action is to set a power-mode status of the computing device 300 based on the power-mode status of the docking apparatus 308. Thus, if the docking apparatus 308 is switched ON by the user, the control unit 310 switches ON the computing device 300. Similarly, if the docking apparatus 308 is switched OFF by the user, the control unit 310 switches OFF the computing device 300.

Figure 4:
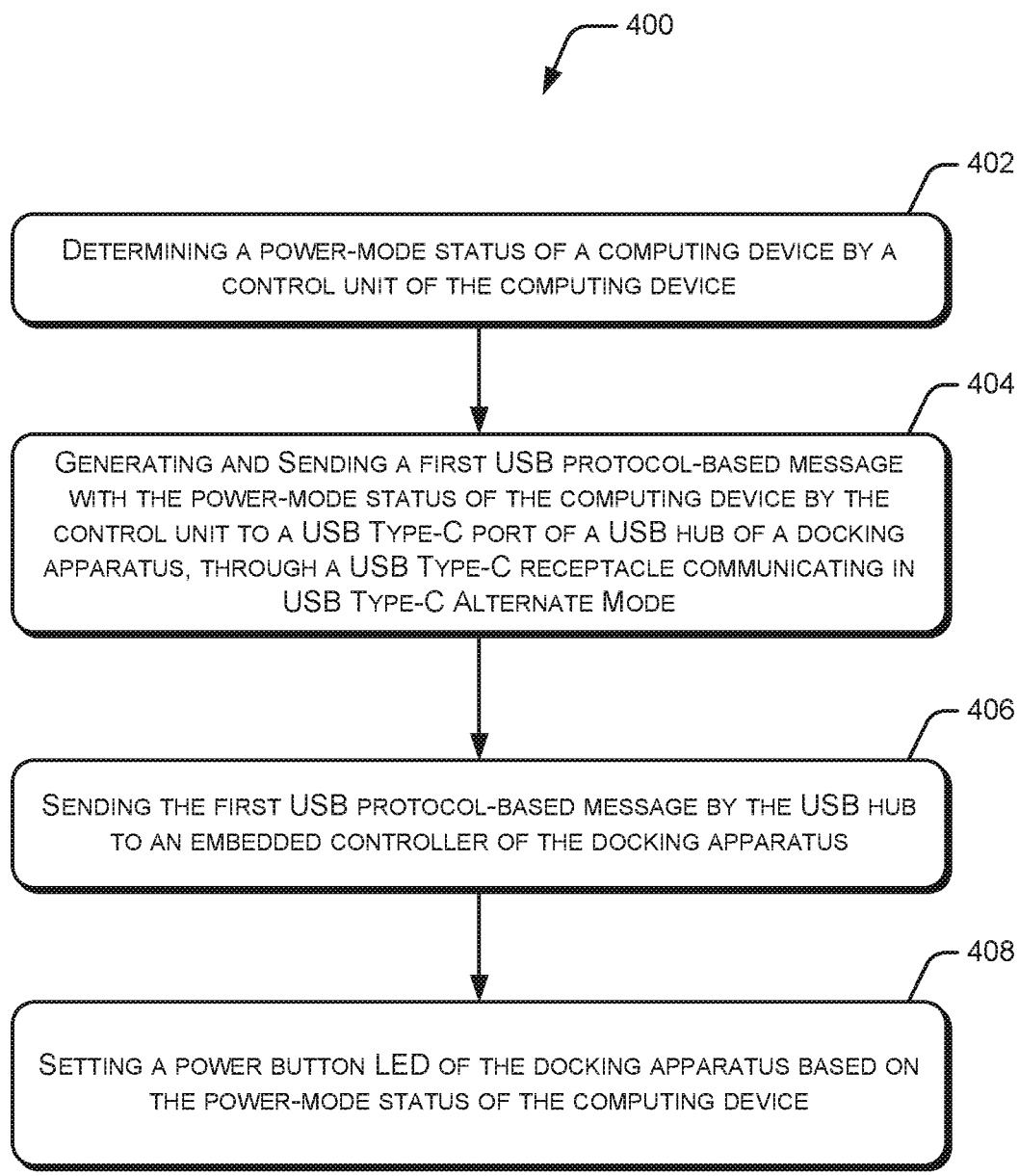
FIG. 4 illustrates a method for communication between a docking apparatus and a computing device, according to an example of the present subject matter.

FIG. 4 illustrates a method 400 for communication between a docking apparatus and a computing device, according to an example of the present subject matter. The method 400 can be implemented by a processing resource or a system through any suitable hardware, a non-transitory machine-readable medium, or a combination thereof. In some example implementations, processes involved in the method 400 can be executed by a processing resource based on instructions stored in a non-transitory computer-readable medium in a docking apparatus and a computing device coupled to the docking apparatus. The non-transitory computer-readable medium may include, for example, digital memories, magnetic storage media, such as a magnetic disks and magnetic tapes, hard drives, or optically readable digital data storage media. While the method 400 is described herein with respect to the docking apparatus 200 and the computing device 300, the method 400 can be implemented in other docking apparatuses and computing devices in a similar manner. The docking apparatus 200 includes a USB hub having a USB Type-C port couplable to a USB Type-C receptacle of the computing device 300 to communicate in USB Alternate Mode.

Referring to FIG. 4, at block 402, a power-mode status of the computing device 300 is determined by the control unit 310 of the computing device 300. The power-mode status of the computing device 300 may be one of as enlisted in Table 1. At block 404, a first USB protocol-based message with the power-mode status of the computing device 300 is generated and sent by the control unit 310 to the USB Type-C port of the USB hub 102 of the docking apparatus 200, through the USB Type-C receptacle 302 communicating in USB Type-C Alternate Mode.

At block 406, the first USB protocol-based message is sent by the USB hub 102 to the embedded controller 108 of the docking apparatus 200. After this, the first USB protocol-based message is decoded by the embedded controller 108 to determine the power-mode status of the computing device 300. Accordingly, at block 408, a power button LED of the docking apparatus 200 is set based on the power-mode status of the computing device 300.

Figure 5:
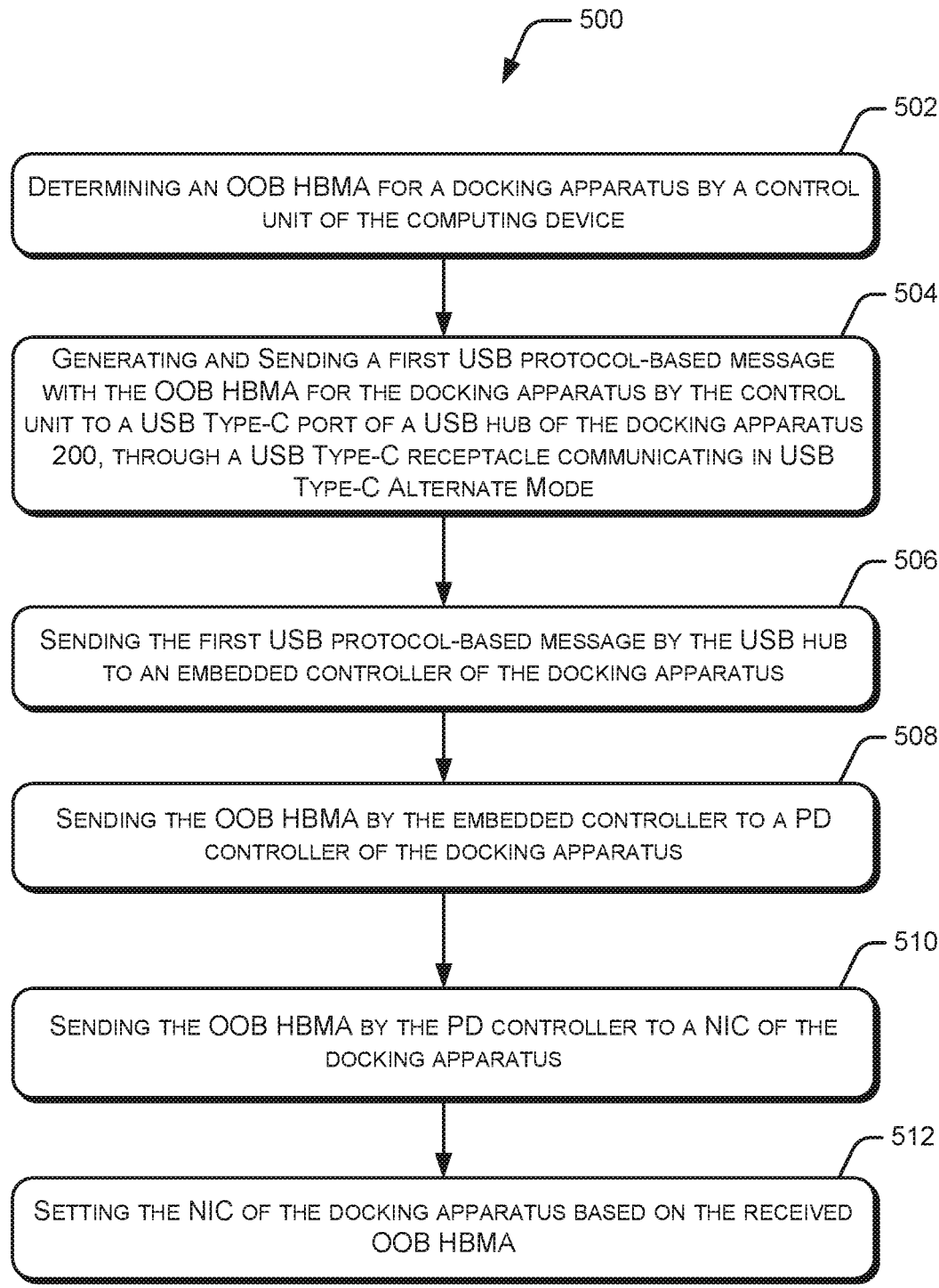
FIG. 5 illustrates a method for communication between a docking apparatus and a computing device, according to an example of the present subject matter.

FIG. 5 illustrates a method 500 for communication between a docking apparatus and a computing device, according to an example of the present subject matter. The method 500 can be implemented by a processing resource or a system through any suitable hardware, a non-transitory machine-readable medium, or a combination thereof. In some example implementations, processes involved in the method 500 can be executed by a processing resource based on instructions stored in a non-transitory computer-readable medium in a docking apparatus and a computing device coupled to the docking apparatus. The non-transitory computer-readable medium may include, for example, digital memories, magnetic storage media, such as a magnetic disks and magnetic tapes, hard drives, or optically readable digital data storage media. While the method 500 is described herein with respect to the docking apparatus 200 and the computing device 300, the method 500 can be implemented in other docking apparatuses and computing devices in a similar manner. The docking apparatus 200 includes a USB hub having a USB Type-C port couplable to a USB Type-C receptacle of the computing device 300 to communicate in USB Alternate Mode.

Referring to FIG. 5, at block 502, an OOB HBMA for the docking apparatus 200 is determined by the control unit 310 of the computing device 300. The OOB HBMA may be provided to the computing device 300 by a user. At block 504, a first USB protocol-based message with the OOB HBMA for the docking apparatus 200 is generated and sent by the control unit 310 to the USB Type-C port of the USB hub 102 of the docking apparatus 200, through the USB Type-C receptacle 302 communicating in USB Type-C Alternate Mode.

At block 506, the first USB protocol-based message is sent by the USB hub 102 to the embedded controller 108 of the docking apparatus 200. After this, the first USB protocol-based message is decoded by the embedded controller 108 to determine the OOB HBMA. At block 508, the OOB HBMA is sent by the embedded controller 108 to the PD controller of the docking apparatus 200. At block 510, the OOB HBMA is sent by the PD controller to the NIC of the docking apparatus 200. At block 512, the NIC of the docking apparatus 200 is set based on the received OOB HBMA.

Figure 6:
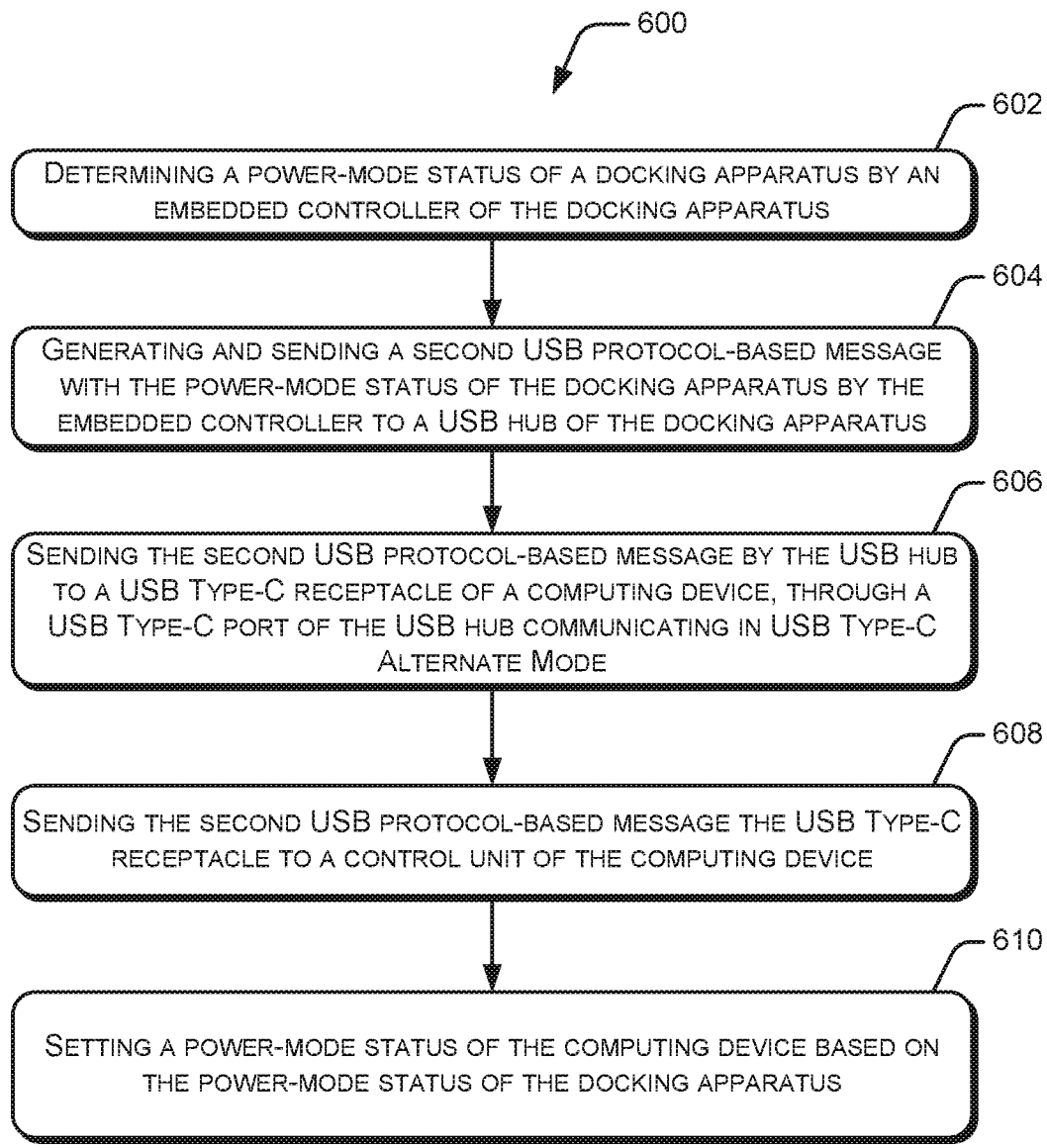
FIG. 6 illustrates a method for communication between a docking apparatus and a computing device, according to an example of the present subject matter.

FIG. 6 illustrates a method 600 for communication between a docking apparatus and a computing device, according to an example of the present subject matter. The method 600 can be implemented by a processing resource or a system through any suitable hardware, a non-transitory machine-readable medium, or a combination thereof. In some example implementations, processes involved in the method 600 can be executed by a processing resource based on instructions stored in a non-transitory computer-readable medium in a docking apparatus and a computing device coupled to the docking apparatus. The non-transitory computer-readable medium may include, for example, digital memories, magnetic storage media, such as a magnetic disks and magnetic tapes, hard drives, or optically readable digital data storage media. While the method 600 is described herein with respect to the docking apparatus 200 and the computing device 300, the method 600 can be implemented in other docking apparatuses and computing devices in a similar manner. The docking apparatus 200 includes a USB hub having a USB Type-C port couplable to a USB Type-C receptacle of the computing device 300 to communicate in USB Alternate Mode.

Referring to FIG. 6, at block 602, a power-mode status of the docking apparatus 200 is determined by the embedded controller 108 of the docking apparatus 200. The power-mode status of the docking apparatus 200 may be ON status or OFF status, depending on the actuation of a power button of the docking apparatus 200. At block 604, a second USB protocol-based message with the power-mode status of the docking apparatus 200 is generated and sent by the embedded controller 108 to the USB hub 102 of the docking apparatus 200.

At block 606, the second USB protocol-based message is sent by the USB hub 102 to the USB Type-C receptacle 302 of the computing device 300, through the USB Type-C port of the USB hub 102 communicating in USB Type-C Alternate Mode.

At block 608, the second USB protocol-based message is sent by the USB Type-C receptacle 302 to the control unit 310 of the computing device 300. After this, the second USB protocol-based message is decoded by the control unit 310 to determine the power-mode status of the docking apparatus 200. Accordingly, at block 610, a power-mode status of the computing device 300 is set based on the power-mode status of the docking apparatus 200.

Figure 7:
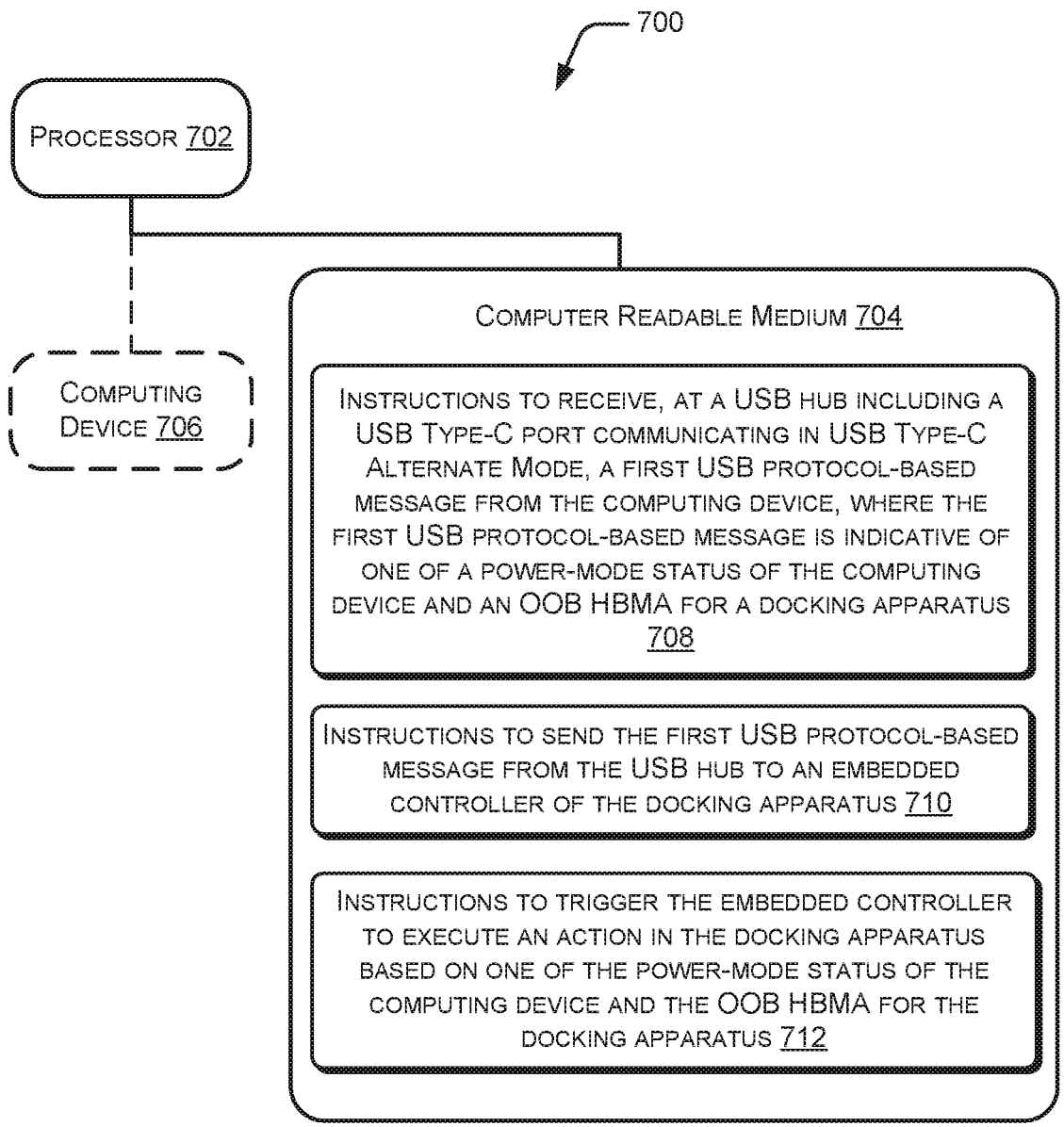
FIG. 7 illustrates a system environment implementing a non-transitory computer-readable medium for communication between a docking apparatus and a computing device, according to an example of the present subject matter.

FIG. 7 illustrates a system environment 700 implementing a non-transitory computer-readable medium for communication between a docking apparatus and a computing device, according to an example of the present subject matter. The system environment 700 includes a processor 702 communicatively coupled to the non-transitory computer-readable medium 704. In an example, the processor 702 may be a processing resource of a docking apparatus for fetching and executing computer-readable instructions from the non-transitory computer-readable medium 704 for communication with a computing device. The docking apparatus may be the docking apparatus 100 or 200 as described with reference to FIGS. 1 and 2. The computing device may the computing device 300 as described with reference to FIG. 3.

The non-transitory computer-readable medium 704 can be, for example, an internal memory device or an external memory device. In an example implementation, the processor 702 may be communicatively coupled to the non-transitory computer-readable medium 704 through a communication link. The communication link may be a direct communication link, such as any memory read/write interface. In another example implementation, the communication link may be an indirect communication link, such as a network interface. In such a case, the processor 702 can access the non-transitory computer-readable medium 704 through a communication network.

In an example implementation, the non-transitory computer-readable medium 704 includes a set of computer-readable instructions for communication between a docking apparatus and a computing device. The set of computer-readable instructions can be accessed by the processor 702 and subsequently executed to perform acts for communication between a docking apparatus and a computing device. The processor 702 may communicate with a computing device 706.

Referring to FIG. 7, in an example, the non-transitory computer-readable medium 704 includes instructions 708 to receive, at a USB hub including a USB Type-C port communicating in USB Type-C Alternate Mode, a first USB protocol-based message from the computing device 706. The first USB protocol-based message is indicative of one of a power-mode status of the computing device 706 and an OOB HBMA for the docking apparatus.

The non-transitory computer-readable medium 704 includes instructions 710 to send the first USB protocol-based message from the USB hub to an embedded controller of the docking apparatus, and includes instructions 712 to trigger the embedded controller to execute an action in the docking apparatus based on one of the power-mode status of the computing device and the OOB HBMA for the docking apparatus. With the power-mode status of the computing device in the first USB protocol-based message, the action is to set a power button LED of the docking apparatus based on the power-mode status of the computing device. Further, with the OOB HBMA in the first USB protocol-based message, the action is to send the OOB HBMA to a PD controller of the docking apparatus. The non-transitory computer-readable medium 704 further includes instructions send the OOB HBMA from the PD controller to a NIC of the docking apparatus, and trigger the NIC to set the NIC based on the OOB HBMA.

In an example implementation, the non-transitory computer-readable medium 704 includes instructions to determine a power-mode status of the docking apparatus by the embedded controller, and send a second USB protocol-based message comprising the power-mode status of the docking apparatus to the USB hub. The non-transitory computer-readable medium 704 further includes instructions send the second USB protocol-based message with the power-mode status of the docking apparatus from the USB hub to the computing device, through the USB port communicating in USB Alternate Mode to execute an action in the computing device based on the power-mode status of the docking apparatus. The action herein is to set a power-mode status of the computing device based on the power-mode status of the docking apparatus.

Although examples for the present disclosure have been described in language specific to structural features and/or methods, it is to be understood that the appended claims are not limited to the specific features or methods described herein. Rather, the specific features and methods are disclosed and explained as examples of the present disclosure.

We claim:

1. A docking apparatus comprising:
a Universal Serial Bus (USB) hub including a USB port couplable to a computing device to communicate in USB Alternate Mode, the USB hub is to receive a first USB protocol-based message from the computing device, through the USB port communicating in USB Alternate Mode, the first USB protocol-based message comprising a first device operating parameter; and
an embedded controller coupled to the USB hub by a USB interface, the embedded controller to:
receive the first USB protocol-based message from the USB hub; and
execute a first action in the docking apparatus based on the first device operating parameter.

2. The docking apparatus as claimed in claim 1, wherein the first device operating parameter is indicative of a power-mode status of the computing device, and wherein the first action is to set a power button light emitting diode (LED) of the docking apparatus based on the power-mode status of the computing device.

3. The docking apparatus as claimed in claim 1, wherein the first device operating parameter comprises an out-of-band host bus media access control (MAC) address (OOB HBMA) for the docking apparatus.

4. The docking apparatus as claimed in claim 3, further comprising:
a power delivery (PD) controller coupled to the embedded controller, wherein the first action is to send the OOB HBMA to the PD controller; and
a network interface controller (NIC) coupled to the PD controller, the NIC is to receive the OOB HBMA from the PD controller and set the NIC based on the OOB HBMA.

5. The docking apparatus as claimed in claim 1, wherein the embedded controller is to:
determine a second device operating parameter, the second device operating parameter being indicative of an operating status of the docking apparatus; and
send a second USB protocol-based message comprising the second device operating parameter to the USB hub; and
the USB hub is to:
send the second USB protocol-based message to the computing device, through the USB port communicating in USB Alternate Mode to execute a second action in the computing device based on the operating status of the docking apparatus.

6. The docking apparatus as claimed in claim 5, wherein the operating status of the docking apparatus comprises a power-mode status of the docking apparatus.

7. The docking apparatus as claimed in claim 1, wherein the USB port is a USB Type-C port to communicate in USB Type-C Alternate Mode.

8. A computing device comprising:
a Universal Serial Bus (USB) Type-C receptacle couplable to a USB Type-C port of a USB hub of a docking apparatus that includes an embedded controller coupled to the USB hub by a USB interface, the USB Type-C receptacle to communicate in USB Type-C Alternate Mode; and
a control unit coupled to the USB Type-C receptacle, the control unit is to send a first USB protocol-based message with a first device operating parameter to the USB hub of the docking apparatus, through the USB Type-C receptacle communicating in USB Type-C Alternate Mode, to execute a first action in the docking apparatus based on the first device operating parameter.

9. The computing device as claimed in claim 8, wherein the first device operating parameter is indicative of a power-mode status of the computing device.

10. The computing device as claimed in claim 8, wherein the first device operating parameter comprises an out-of-band host bus media access control (MAC) address (OOB HBMA) for the docking apparatus.

11. The computing device as claimed in claim 8, wherein the control unit is to:
receive a second USB protocol-based message with a second device operating parameter from the USB hub of the docking apparatus, through the USB Type-C receptacle communicating in USB Type-C Alternate Mode, the second device operating parameter being indicative of an operating status of the docking apparatus; and
execute a second action in the computing device based on the operating status of the docking apparatus.

12. The computing device as claimed in claim 11, wherein the operating status of the docking apparatus comprises a power-mode status of the docking apparatus, and wherein the second action is to set a power-mode status of the computing device based on the power-mode status of the docking apparatus.

13. A non-transitory computer-readable medium comprising computer-readable instructions, which, when executed by a processor of a docking apparatus, cause the processor to:
receive, at a Universal Serial Bus (USB) hub including a USB Type-C port communicating in USB Type-C Alternate Mode, a first USB protocol-based message from a computing device, the first USB protocol-based message being indicative of one of a power-mode status of the computing device and an out-of-band host bus media access control (MAC) address (OOB HBMA) for the docking apparatus;
send the first USB protocol-based message from the USB hub to an embedded controller of the docking apparatus using a USB interface coupled between the USB hub and the embedded controller; and
trigger the embedded controller to execute an action in the docking apparatus based on one of the power-mode status of the computing device and the OOB HBMA for the docking apparatus.

14. The non-transitory computer-readable medium as claimed in claim 13, wherein the action is to set a power button light emitting diode (LED) of the docking apparatus based on the power-mode status of the computing device.

15. The non-transitory computer-readable medium as claimed in claim 13, wherein the action is to send the OOB HBMA to a PD controller of the docking apparatus, wherein the non-transitory computer-readable medium further comprising computer-readable instructions, which, when executed by the processor, cause the processor to:
send the OOB HBMA from the PD controller to a network interface controller (NIC) of the docking apparatus; and
trigger the NIC to set the NIC based on the OOB HBMA.

* * * * *